United States Patent
Tanskanen et al.

[11] Patent Number: 5,505,988
[45] Date of Patent: Apr. 9, 1996

[54] METHOD AND ARRANGEMENT FOR COLOURING OPTICAL FIBRES

[75] Inventors: Juha Tanskanen; Erkki Peltoluhta, both of Vantaa, Finland

[73] Assignee: Nokia-Maillefer Oy, Finland

[21] Appl. No.: 356,173

[22] PCT Filed: May 10, 1993

[86] PCT No.: PCT/FI93/00201

§ 371 Date: Jan. 3, 1995

§ 102(e) Date: Jan. 3, 1995

[87] PCT Pub. No.: WO93/25925

PCT Pub. Date: Dec. 23, 1993

[30] Foreign Application Priority Data

Jun. 18, 1992 [FI] Finland .................... 922886

[51] Int. Cl.⁶ ............................ C03C 25/02
[52] U.S. Cl. .............. 427/163.2; 118/404; 118/419; 118/423; 118/641; 427/358; 427/385.5; 427/434.7; 427/512; 427/514
[58] Field of Search ................. 427/163.2, 434.7, 427/385.5, 512, 514, 510, 358, 511; 118/641, 404, 419, 423

[56] References Cited

U.S. PATENT DOCUMENTS

| | | | |
|---|---|---|---|
| 5,294,260 | 3/1994 | Larsen-Moss | 118/620 |
| 5,330,786 | 7/1994 | Nonaka et al. | 427/513 |
| 5,334,421 | 8/1994 | McNutt | 427/513 |

FOREIGN PATENT DOCUMENTS

| | | |
|---|---|---|
| 3208172 | 9/1983 | Germany. |
| 3427835 | 2/1986 | Germany. |

*Primary Examiner*—Janyce Bell
*Attorney, Agent, or Firm*—Nixon & Vanderhye

[57] ABSTRACT

The invention relates to a method and an arrangement for coloring optical fibres, each fibre being drawn through an upper nozzle in a coloring tool into a color chamber, into which colorant is introduced, and further through a lower nozzle out of the color chamber. The colored fibre is passed onward through a quartz tube of a UV lamp curing the colorant. To reduce costs and to increase the production rate, the coloring tools are arranged close to each other in pairs in at least two different planes, and the fibres to be colored are drawn simultaneously through the coloring tools and further simultaneously through the quartz tube of the UV lamp common to the fibres to be colored.

4 Claims, 1 Drawing Sheet

METHOD AND ARRANGEMENT FOR COLOURING OPTICAL FIBRES

The invention relates to a method for colouring optical fibres, wherein each fibre is drawn through an upper nozzle in a colouring tool into a colour chamber, into which colorant is introduced, and further through a lower nozzle out of the colour chamber, and wherein the coloured fibre is passed onward through a quartz tube of a UV lamp curing the colorant. The invention also relates to an arrangement for colouring optical fibres.

Optical fibres are used more and more extensively in different technical fields, such as telecommunication technology. The small size and fragile structure of optical fibres, however, make them difficult to handle. Similarity in appearance of fibres also causes problems in practical applications as it is difficult to distinguish different fibres from each other without an identification system.

It is therefore a common practice to colour different fibres with different colours, and so individual fibres are easier to distinguish from each other.

At present, optical fibres are coloured e.g. by UV curable colorants. They are coloured one by one in a separate coloration process mainly comprising a colouring tool and UV lamps for curing the colorant. The colouring tool comprises successive nozzles and a colour chamber between the nozzles. The UV lamps comprise a quartz tube through which the fibre passes. The fibre to be coloured is drawn through the upper nozzle and the colour chamber and further through the lower nozzle. At the same time colorant is introduced into the colour chamber so that it adheres to the surface of the fibre. After the lower nozzle, the fibre is drawn into the quartz tube of the UV lamp so that the UV radiation generated by the lamp cures the colorant on the surface of the fibre. A separate apparatus of this kind is arranged for each fibre to be coloured.

The above-described prior art includes e.g. U.S. Pat. No. 4,629,285.

A drawback of the prior art technique is that it is expensive as the apparatus costs are very high. This is due to the fact that each fibre to be coloured needs its own separate colouring apparatus. For instance, each fibre to be coloured needs one or two expensive UV lamps, etc. A further problem is that the coloration process has been a separate process, which increases the number of work stages required in the cable production and further increases the costs.

The object of the invention is to provide a method and an arrangement by means of which the drawbacks of the prior art technique can be eliminated. This is achieved by means of the invention. The method according to the invention is characterized in that the colouring tools are arranged close to each other in pairs in at least two different planes; and that the fibres to be coloured are drawn simultaneously through the colouring tools and further simultaneously through the quartz tube of the UV lamp common to the fibres to be coloured. The arrangement according to the invention, in turn, is characterized in that the colouring tools are positioned close to each other in pairs in at least two different planes that the fibres to be coloured can be drawn simultaneously through the colouring tools and the quartz tube of the UV lamp common to the fibres to be coloured.

As compared with the prior art technique, one advantage of the invention is that the coloration process can be made part of e.g. the subsequent stage of the cable production process in a simple way so that the separate fibre colouring stage is eliminated. This allows considerable savings to be achieved in storage and handling costs. Another advantage is that the number of expensive UV lamps is reduced as compared with the prior art technique. The coloration of four fibres requires eight UV lamps in the prior art technique while only two UV lamps are required when applying the invention in a corresponding case, which is a major difference. Still another advantage of the invention is that the total production capacity is increased as compared with the prior art.

BRIEF DESCRIPTION OF THE DRAWINGS

In the following the invention will be described in more detail by means of a preferred embodiment shown in the attached drawings, in which

FIG. 1 shows schematically an arrangement according to the invention. The reference numeral 1 indicates optical fibres to be coloured. The reference numeral 2 indicates colouring tools. The colouring tools 2 comprise an upper nozzle 3 and a lower nozzle 4 and a colour chamber 5 positioned between the nozzles. The reference numeral 6 indicates UV lamps. The quartz tube of the UV lamp is indicated by the reference numeral 7.

Figure 2:
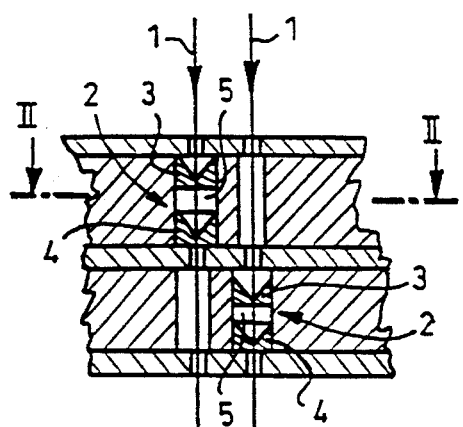
FIG. 2 is a sectional view in accordance with the arrows II—II shown in FIG. 1.
Figure 2:
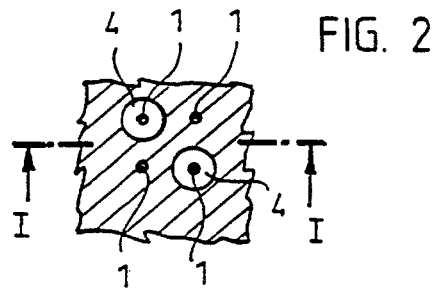

The arrangement further comprises means for introducing colorant into the colour chamber 5. These means are not shown in the figures as they are obvious to one skilled in the art.

To colour the fibre 1, it is drawn through the upper nozzle 3 into the colour chamber 5 and further through the lower nozzle 4 out of the colour chamber 5. At the same time, colorant is introduced into the colour chamber 5 so that it adheres to the surface of the optical fibre passing through the colour chamber. After the lower nozzle 4, the coloured fibre is passed into the quartz tube 7 of the UV lamp 6 and further onward. When the fibre i is within the quartz tube 7, radiation generated by the UV lamp 6 acts on the fibre, thus curing the colorant. This principle is obvious to one skilled in the art, so it will not be described more closely here. As mentioned above, the above-described technique has previously been applied separately to each fibre.

Figure 1:
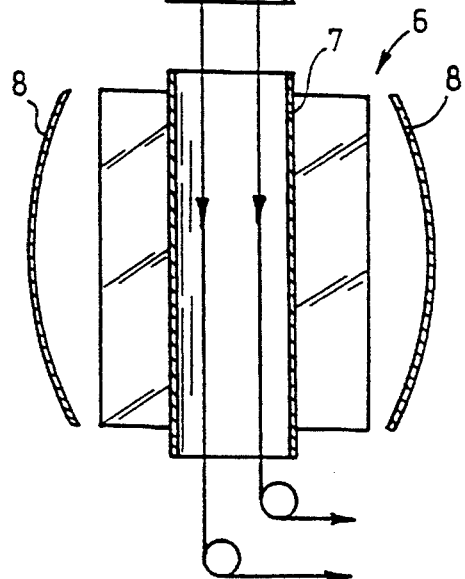
FIG. 1 is a schematic sectional side view of an arrangement according to the invention.

An essential aspect of the method according to the invention is that the colouring tools 2 are arranged close to each other in pairs in at least two different planes. The fibres 1 to be coloured are drawn simultaneously through the colouring tools 2 and further simultaneously through the quartz tube 7 of the UV lamp 6 common to the fibres to be coloured. An essential aspect of the arrangement according to the invention, in turn, is that the colouring tools 2 are arranged close to each other in pairs in at least two different planes so that the fibres 1 to be coloured can be drawn simultaneously through the colouring tools 2 and through the quartz tube 7 of the UV lamp 6 common to the fibres 1 to be coloured. The colouring tools 2 are preferably positioned in pairs in groups of four colouring tools so that the colouring tools 2 in the diagonal direction are in the same plane. This appears clearly from FIG. 2. It is further to be noted that FIG. 1 is a section in accordance with the arrows I—I shown in FIG. 2.

According to the invention, the fibres, e.g. the four fibres 1 shown in the figures, are thus drawn simultaneously through the colouring tools 2 and the quartz tube 7 of the UV lamp 6. The colouring tools 2 are positioned in pairs in different planes, as described above; i.e. one diagonally positioned pair in a group of e.g. four colouring tools is in one plane, while the other respective pair is in another plane, as shown in FIG. 2. Accordingly, the colouring tools 2 will be positioned so close to each other that the fibres 1 passing through them can be passed simultaneously into the quartz tube 7 of the UV lamp 6 without touching each other. The diameter of the quartz tube 7 is e.g. 19 mm. This allows the fibres to be cured simultaneously. The beam of the UV lamp 6 is spread by mirror means 8 so that it acts evenly on all fibres 1 passing simultaneously within the quartz tube 7.

By means of the arrangement described above, the fibres 1, of which there are e.g. four, can be coloured simultaneously with desired colours, and the colours are cured by the common UV lamp 6. A desired colour is, of course, introduced into each colouring tool 2, and so each fibre 1 will be coloured as desired.

Figure 3:
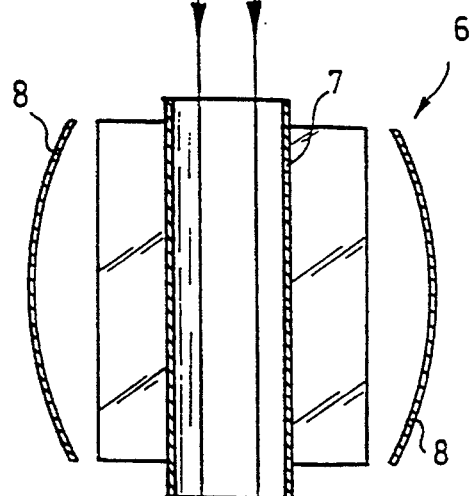
FIG. 3 is a schematic side view of an apparatus used in the production of an optical ribbon fibre, in which the arrangement according to the invention is utilized.
Figure 3:
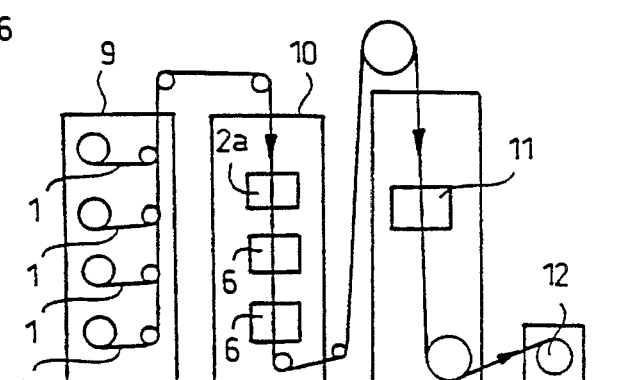
Figure 4:
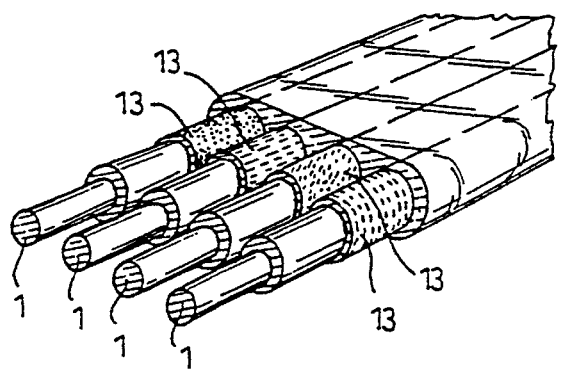
FIG. 4 is a schematic view of an optical ribbon fibre with coloured fibres.

The arrangement according to the invention may simply be made part of a ribbon fibre line, for instance. FIG. 3 shows schematically one such solution..The reference numeral 9 indicates an input capstan from which uncoloured fibres 1 are unwound. A colouring unit 10 for colouring the fibres i is positioned next. The colouring unit 10 may be e.g. an arrangement such as shown in FIG. 1. The colouring tools are indicated in FIG. 3 only schematically by the reference numeral 2a. The block indicated by the reference numeral 2a comprises the colouring tools 2 shown in FIG. 1. The UV lamps are indicated by the reference numeral 6. The UV lamps, of course, also comprise mirror means for spreading the beam as desired. The following process stage is a ribbon fibre production unit 11, where the fibres coloured with desired colours are combined into a ribbon fibre, which is illustrated in FIG. 4. The ribbon fibre may be finally wound onto a storage reel 12. In the example of FIG. 4, the colour layers of the fibres are indicated by the reference numeral 13. This arrangement may be varied according to the requirements. If a ribbon fibre comprising e.g. 12 fibres 1 is to be produced, three colouring units 10 are used, etc.

The embodiment described above is not intended to restrict the invention in any way, but the invention may be modified within the scope of the claims as desired. Accordingly, it is obvious that the arrangement according to the invention or its details need not necessarily be exactly similar to those shown in the figures but other solutions are possible as well. By utilizing the invention, it is possible to produce ribbon fibre comprising e.g. four, eight, eighteen, etc. coloured fibres by adding one or more colouring modules shown in FIG. 1 to the ribbon fibre production line, as shown in FIG. 3. Means for transferring fibres may, of course, be any devices known per se. The number of the UV lamps is not predetermined, but it is possible to use a single lamp, two successive lamps, etc., as required in each particular case. As mentioned above, the lamp/s is/are common to all fibres passing through the colouring module, as mentioned above.

We claim:

1. In a method of colouring optical fibres, wherein each fibre is drawn through, in sequence, a coloring tool including an upper nozzle a colour chamber into which a curable colorant is introduced, and a lower nozzle out of the colour chamber, and wherein the fibre is passed onward through a quartz tube of a UV lamp to cure the colorant on the fibre, the improvement comprising arranging at least a pair of the colouring tools sufficiently close to each other in at least two different planes so that the fibres to be coloured are drawn simultaneously through the colouring tools and further simultaneously through the quartz tube of the UV lamp common to the fibres to be coloured.

2. In an arrangement for colouring a plurality of optical fibres, comprising a colouring tool for each fibre to be coloured, each of said colouring tools comprising an upper nozzle, a colour chamber and a lower nozzle; and at least one UV lamp provided downstream of the plurality of colouring tools for curing the colorant on the surface of the fibre, each fibre to be coloured being arranged to pass through a respective one of said plurality of colouring tools and further through a quartz tube of the UV lamp, the improvement wherein said plurality of colouring tools are positioned sufficiently close to each other in at least two different planes so that the fibres to be coloured can be drawn simultaneously through said plurality of colouring tools and the quartz tube of the UV lamp common to the fibres to be coloured.

3. The arrangement according to claim 2, wherein said plurality of colouring tools are positioned in pairs in groups of four so that said plurality of colouring tools in a diagonal direction are in the same plane.

4. The arrangement according to claim 3, wherein a beam of the UV lamp is arranged to be spread by a mirror so that it acts evenly on all fibres passing simultaneously within the quartz tube.

* * * * *